United States Patent [19]
Christenson

[11] Patent Number: 5,418,912
[45] Date of Patent: May 23, 1995

[54] SYSTEM AND METHOD FOR CONTROLLING BUFFER TRANSMISSION OF DATA PACKETS BY LIMITING BUFFERED DATA PACKETS IN A COMMUNICATION SESSION

[75] Inventor: David A. Christenson, Rochester, Minn.

[73] Assignee: International Business Machines Corporation, Armonk, N.Y.

[21] Appl. No.: 138,620

[22] Filed: Oct. 18, 1993

Related U.S. Application Data

[63] Continuation of Ser. No. 883,062, May 8, 1992, abandoned, which is a continuation of Ser. No. 570,060, Aug. 20, 1990, abandoned.

[51] Int. Cl.⁶ .............................................. G06F 13/00
[52] U.S. Cl. ..................................... 395/200; 395/250; 364/239; 364/240.9; 364/940.2; 364/DIG. 1
[58] Field of Search ................. 364/200, 900; 395/200, 395/275, 280, 680, 700; 370/60 T, 85 T

[56] References Cited

U.S. PATENT DOCUMENTS

| | | | |
|---|---|---|---|
| 4,040,027 | 8/1977 | van Es et al. | 364/900 |
| 4,125,870 | 11/1978 | Suzuki et al. | 364/900 |
| 4,258,418 | 3/1981 | Heath | 364/200 |
| 4,692,894 | 9/1987 | Bemis | 364/900 |
| 4,766,534 | 8/1988 | DeBenedictis | 364/200 |
| 4,768,150 | 8/1988 | Chang et al. | 395/700 |
| 4,771,391 | 9/1988 | Blasbalg | 364/514 |
| 4,791,566 | 12/1988 | Sudama et al. | 364/200 |
| 4,803,685 | 2/1989 | Oget | 371/33 |
| 4,851,988 | 7/1989 | Trottier et al. | 364/200 |
| 4,860,193 | 8/1989 | Bentley et al. | 364/200 |
| 4,914,653 | 4/1990 | Bishop et al. | 370/85.6 |
| 4,941,089 | 7/1990 | Fisher | 364/200 |
| 4,965,793 | 10/1990 | Polzin et al. | 370/94.1 |
| 5,040,176 | 8/1991 | Barzilai et al. | 370/94.1 |
| 5,042,029 | 8/1991 | Hayakawa | 370/60 |
| 5,101,402 | 3/1992 | Chin et al. | 370/17 |
| 5,117,486 | 5/1992 | Clark et al. | 395/250 |
| 5,140,584 | 8/1992 | Suzuki | 370/60 |
| 5,175,854 | 12/1992 | Cheung et al. | 395/650 |
| 5,301,280 | 4/1994 | Schwartz et al. | 395/325 |

*Primary Examiner*—Christopher B. Shin
*Attorney, Agent, or Firm*—J. Michael Anglin; Kenneth C. Hill; Andrew J. Dillon

[57] ABSTRACT

A system and method for controlling data transmission between computer systems is suitable for use at the OSI session level of structured network architectures. A receiving logical unit can dynamically control packet window sizes to optimize its resources. In the sending logical unit, the number of packets which may be sent by a single session, but not yet acknowledged at the data link control level, is limited. This results in all sessions in the system having a relatively fair access to a single communications link. The number of packets allowed for any given session need not have any relationship to the window size in an adaptive session level pacing environment.

9 Claims, 3 Drawing Sheets

| TIME | EVENT | DLC BUFFER |
|---|---|---|
| T1 | S1 STARTS TO SEND 10 PACKETS | P1 P1 |
| T2 | PACKET DELIVERED<br>S1 SENDS PACKET | P1<br>P1 P1 |
| T3 | S2 SENDS 1 PACKET | P1 P1 P2 |
| T4 | PACKET DELIVERED<br>S1 SENDS PACKET | P1 P2<br>P1 P2 P1 |
| T5 | S3 STARTS TO SEND 3 PACKETS | P1 P2 P1 P3 P3 |
| T6 | PACKET DELIVERED<br>S1 SENDS PACKET | P2 P1 P3 P3<br>P2 P1 P3 P3 P1 |
| T7 | PACKET DELIVERED | P1 P3 P3 P1 |
| T8 | PACKET DELIVERED<br>S1 SENDS PACKET | P3 P3 P1<br>P3 P3 P1 P1 |
| T9 | PACKET DELIVERED<br>S3 SENDS PACKET | P3 P1 P1<br>P3 P1 P1 P3 |
| T10 | PACKET DELIVERED | P1 P1 P3 |
| T11 | PACKET DELIVERED<br>S1 SENDS PACKET | P1 P3<br>P1 P3 P1 |
| T12 | PACKET DELIVERED<br>S1 SENDS PACKET | P3 P1<br>P3 P1 P1 |
| T13 | PACKET DELIVERED | P1 P1 |
| T14 | PACKET DELIVERED<br>S1 SENDS PACKET | P1<br>P1 P1 |
| T15 | PACKET DELIVERED<br>S1 SENDS PACKET | P1<br>P1 P1 |
| T16 | PACKET DELIVERED | P1 |
| T17 | PACKET DELIVERED | EMPTY |

Fig. 4

SYSTEM AND METHOD FOR CONTROLLING BUFFER TRANSMISSION OF DATA PACKETS BY LIMITING BUFFERED DATA PACKETS IN A COMMUNICATION SESSION

This is a continuation of application Ser. No. 07/883,062, filed May 8, 1992, now abandoned, which is a continuation of application Ser. No. 07/570,060, filed Aug. 20, 1990, abandoned.

BACKGROUND OF THE INVENTION

1. Field of the Invention

The present invention relates generally to electronic computer systems, and more specifically to a system and method for communicating data between computer systems.

2. Description of the Prior Art

Use of networks of various types to connect computer systems together continues to increase. These networks are used to communicate data between the various systems connected to them. Performance of the network is an ongoing concern, and many techniques have been developed and used to enhance data flow within networks.

The precise data transmission techniques used depend on both the hardware and systems architecture of the network. The International Organization for Standardization (ISO) has promulgated an Open Systems Interconnection (OSI) communications model for use with data communications between computer systems. This model has been incorporated in many network architectures. The OSI model has 7 different layers, to wit: physical, data link, network, transport, session, presentation, and applications layers. Other structured architectures, such as Systems Network Architecture (SNA), have a similar organization, although the various layers may not be exact equivalents of the OSI model.

Protocols between communicating systems are often implemented at multiple layers of the structured model. For example, the physical layer uses various signalling protocols, and the data link layer ensures that individual data packets are not corrupted during transmission between two directly connected systems. At the same time, the network and transport layers ensure that data packets arrive at the correct systems within a network, and in the correct order. Higher layers also talk to each other using various preselected protocols.

A technique which has been used to control data flow over networks at the session level is session level pacing. This technique has been used in structured architectures such as Systems Network Architecture (SNA). Originally, static pacing was used at the session level. With this technique, a receiving logical unit controls when a sending logical unit may send a window of data packets. This is done by having the receiving logical unit send a message to the sending logical unit that a next window of data packets may now be sent. In static pacing, the window size is fixed when the communications session between the sending and receiving sessions is initialized. Only the timing of window transmission is controllable.

An adaptive pacing technique has also been used which allows the window size to be adjusted dynamically during the communication session. The receiving logical unit controls the size of each window in order to optimize use of its own resources. This technique is described in detail in U.S. Pat. No. 4,736,369, issued to Barzilai, et al, which is incorporated by reference hereinto. As described in such reference, session level pacing generally applies at the link-to-link level, rather than at an end-to-end level.

Although adaptive pacing performs well, and allows more efficient use of communications link and receiving logical unit resources, problems can arise at the sending logical unit. Multiple sessions may be competing for the same physical communications link out of the system at the sending logical unit. These multiple sessions may or may not have different receiving logical units as destinations. When a large window size is granted by one receiving logical unit, a corresponding session in the sending logical unit which transmits a large amount of data can fill up lower level communications buffers in the sending system. This can lead to poor response time on the part of some sessions in the sending logical unit.

Sessions running on the sending system can be classified, for purposes of this discussion, into two categories. The first category, often referred to as interactive sessions, interact with human operators. These sessions typically have a relatively small amount of data which must be transmitted over the network, and user response time is important. The second category, sometimes referred to as batch sessions, typically transmit larger amounts of data over the network. User response times are typically not as important for these sessions. Some sessions actually fall into both categories, and may transmit large amounts of data at some times, and require relatively quick user response times at other times.

When a single communications link out of a system is carrying communications sessions for both interactive and batch sessions, it is common for one or more batch sessions to cause a significant increase in the response time of the system to interactive sessions. This occurs when adaptive session level pacing is used, and a receiving logical unit grants a large transmission window to a batch session. The batch session can then place a very large block of data into the transmission buffer for the lower layers. The data link layer, also referred to as a Data Communications Link (DCL) layer in SNA, has a FIFO buffer which is used for all communications transmitted over a single physical link. If a large amount of data is placed into this buffer, interactive sessions will experience a significant delay before their data can be transmitted. For example, over a 19.2K bps serial communications link, 32K bytes of data will take nearly 15 seconds to transmit. Thus, an interactive session which may need to transmit only one or a few packets can experience a long delay before its data can be transmitted. The amount of delay actually experienced of course depends on a number of system parameters, including window size and communications rates. This phenomenon, wherein a batch session places a large block of data into the communications buffer, has been referred to as "flooding."

It would be desirable to provide a mechanism for controlling processing of a sending logical unit at the session level to minimize the flooding problem described above, thereby improving response time for many categorized as interactive.

SUMMARY OF THE INVENTION

It is therefore an object of the present invention to provide a system and method for controlling data transmission between computer systems.

It is a further object of the present invention to provide such a system and method suitable for use with structured network communication architectures.

It is another object of the present invention to provide such a system and method which provides session level control of a sending logical unit.

Therefore, according to the present invention, a system and method for controlling data transmission between computer systems is suitable for use at the session level of structured network architectures such as SNA. A receiving logical unit can dynamically control packet window sizes to optimize its resources. In the sending logical unit, the number of packets which may be sent by a single session, but not yet acknowledged at the data link control level, is limited. This results in all sessions in the system having a relatively fair access to a single communications link. The number of packets allowed for any given session need not have any relationship to the window size in an adaptive session level pacing environment.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a timing chart illustrating one example of the present invention in operation.

DETAILED DESCRIPTION OF THE INVENTION

Figure 1:
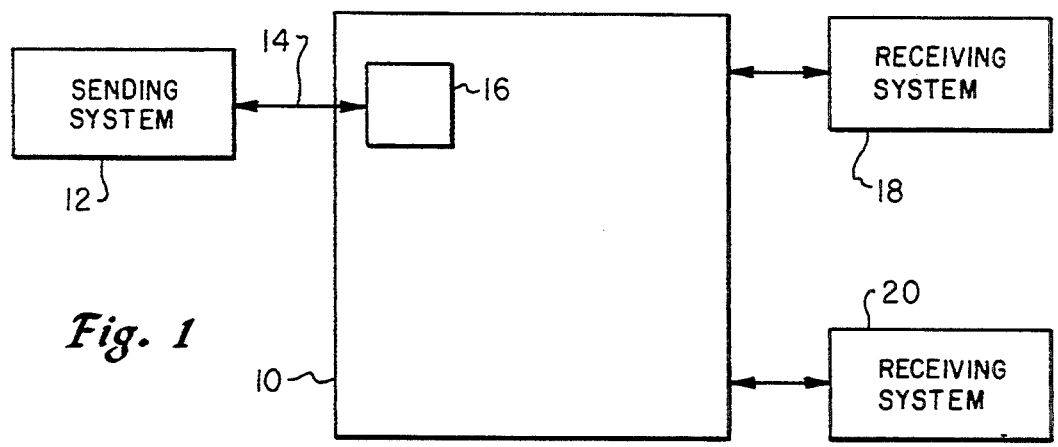
FIG. 1 is a high level block diagram of a network of computer systems.

FIG. 1 illustrates several computer systems attached to a network 10. The architecture of the network 10, including the physical connections thereof and the precise communications protocols used, do not form a part of the present invention. Any of a number of different network protocols may be utilized in accordance with the present invention, as will be apparent to those skilled in the art, in conjunction with the description below.

For purposes of illustration, one system attached to the network 10 will be referred to as the sending system 12. The sending system 12 corresponds to a sending logical unit in an SNA architecture, and may be referred to by other terms in different architectures. The sending system 12 is connected by a physical communications link 14 to an adjacent system 16.

Receiving systems 18, 20 are also connected to network 10. The sending system 12 can be executing several sessions simultaneously, with one session sending information to receiving system 18 while another communicates with receiving system 20. The logical network connections between sending system 12 and each of the receiving systems 18, 20 differ, but each transfers data over the single physical link 14. Depending upon the network architecture, sending system 12 may have more than one physical communications link connected to the network 10. For purposes of illustrating the present invention, it will be assumed that at least two different sessions on the sending system 12 are sharing a single physical communications link 14.

Figure 2:
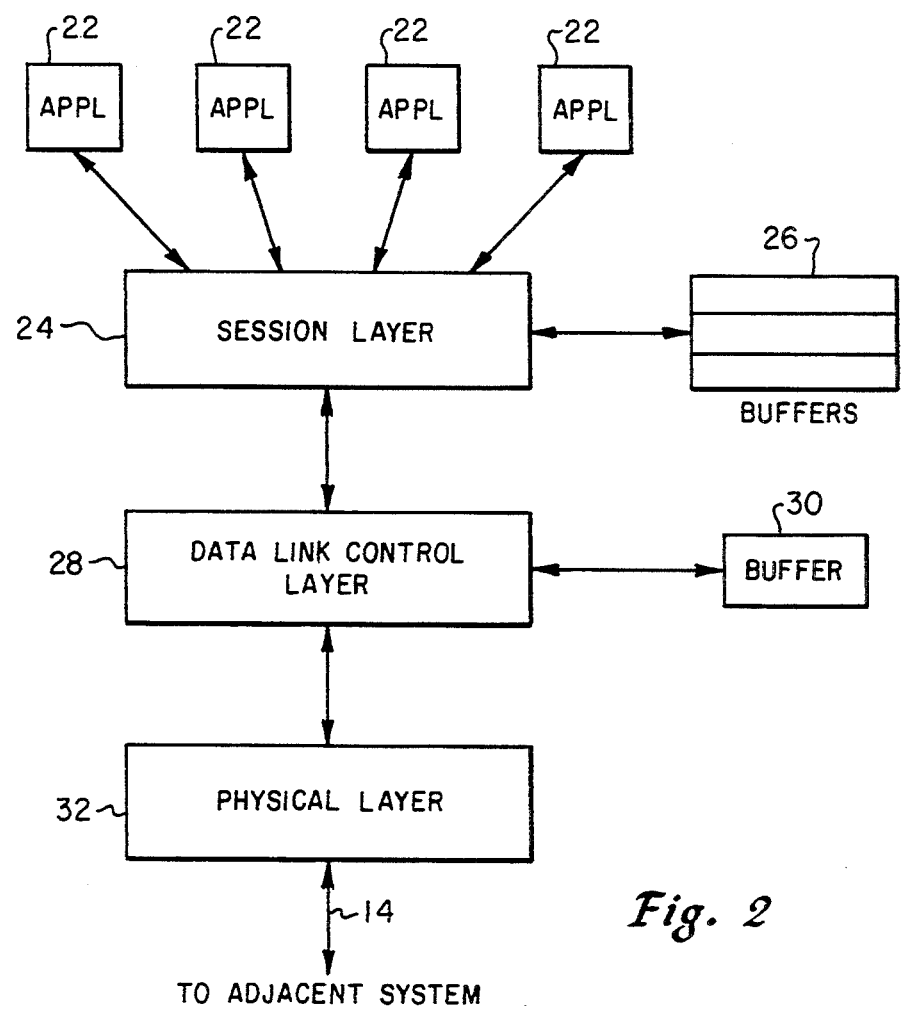
FIG. 2 is a block diagram illustrating various layers in the communications architecture.

FIG. 2 illustrates various software systems within the sending system 12 which are relevant to an understanding of the present invention. FIG. 2 does not show all of the different layers which may exist in a communications system, but only those directly relevant to understanding the invention. Multiple applications 22 communicate, directly or indirectly, with a session layer 24. The session layer 24 is responsible for handling the SNA session level tasks. The session layer 24, depending upon the communication system architecture, may have buffers 26 for holding outgoing and incoming data for the applications 22. Each application 22 is typically mapped to a separate session, and has its own buffer 26. In many cases, the buffers 26 are accessible directly by the applications 22, with the session layer 24 handling the responsibility for controlling transfer of data between the buffers 26 and the underlying layers. The present description is understood to apply to sessions between two directly linked computer systems (link-to-link), but could also apply to sessions controlled at a level concerning the ultimate sender and receiver (end-to-end), or some intermediate level.

A data link control layer 28 communicates, directly or indirectly, with the session layer 24, and has a single buffer 30. Buffer 30 is a FIFO buffer, and is used to temporarily store data which will be transmitted over the physical communications link 14. A single separate buffer (not shown) is also used to buffer incoming data prior to such data being transferred to the session layer 24.

The physical layer 32 represents the hardware connected to the physical communications link 14, and interfaces with the data link control layer 28. The data link control layer 28 is responsible for removing packets of data, typically one or a small number of bytes at a time, from buffer 30 and transferring them into registers within the physical layer 32 for transmission over the physical link 14. For each packet which is transmitted, the data link control layer 28 receives a signal from the corresponding data link control layer at the other end of the physical link 14 indicating that the packet was successfully received. If such a signal is not received, the data link control layer 28 can attempt to resend the packet, or it may simply send an error message back to the session layer 24.

The term packet is used herein in two different ways, although it is believed that the meanings will be clear from the context. The session layer 24 sends packets to the data link control layer 28, which could be referred to as session packets. When the data link control layer 28 sends an acknowledgement to the session layer 24, it is acknowledging that a session packet has been sent.

The data link control layer also sends packets over the physical link 14, but one of these packets, which could be referred to as physical packets, does not necessarily correspond to one session packet. Several physical packets may need to be transmitted to correspond to one session packet. Preferably, the data link control layer 28 sends a single acknowledgement to the session layer 24 only after a session packet has been sent, although some designs could allow such a signal after each physical packet if the session layer 24 is prepared to handle it. For purposes of the present the term packet will generally refer to session packets, and it will be understood that several physical packets may have to be transmitted to correspond to the transmission of a single session packet.

Since a single buffer 30 is used for holding all of the data to be transmitted over the physical link 14, it can be flooded as described above if one of the applications 22 is allowed to send a large block of data to the data link control layer.

In order to prevent this problem, the session layer 24 is provided with a control mechanism for limiting the amount of data which may be sent to the data link control layer 28 at one time by any one application 22. Each application 22 is assigned a maximum number of data packets which can be sent to the data link control layer 28 and not yet acknowledged. If this maximum number of packets is, for example, two for some application, only two data packets may be sent from the session layer 24 to the data link control layer 28. A third packet may not be sent until the data link control layer 28 has transmitted one packet to the adjacent system and received an acknowledgement that such packet was successfully received. When this acknowledgement is received, it is passed back to the session layer 24, which is then allowed to send one more packet to the data link control layer 28. The effect of this control mechanism is to limit the number of packets which any one application may have in the buffer 30 at any time. Since the buffer 30 will not be flooded with a large number of packets from a single application, another application which needs to transmit a packet can place it in the buffer 30 and be ensured that the delay before it is sent is not too long.

Figure 3A:
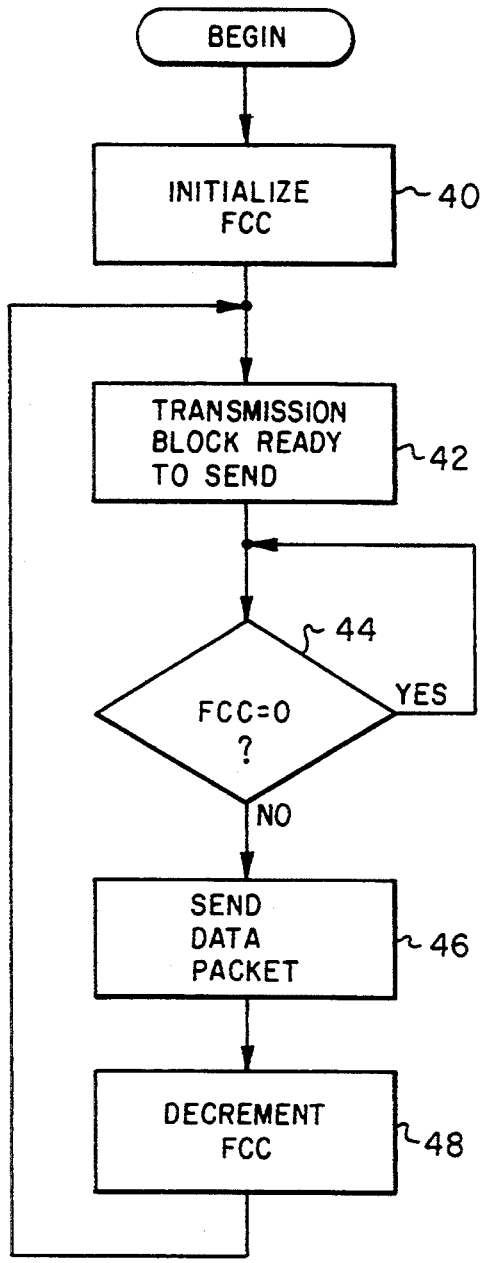
FIGS. 3A and 3B are a flowchart illustrating operation of session level software according to the present invention.
Figure 3B:
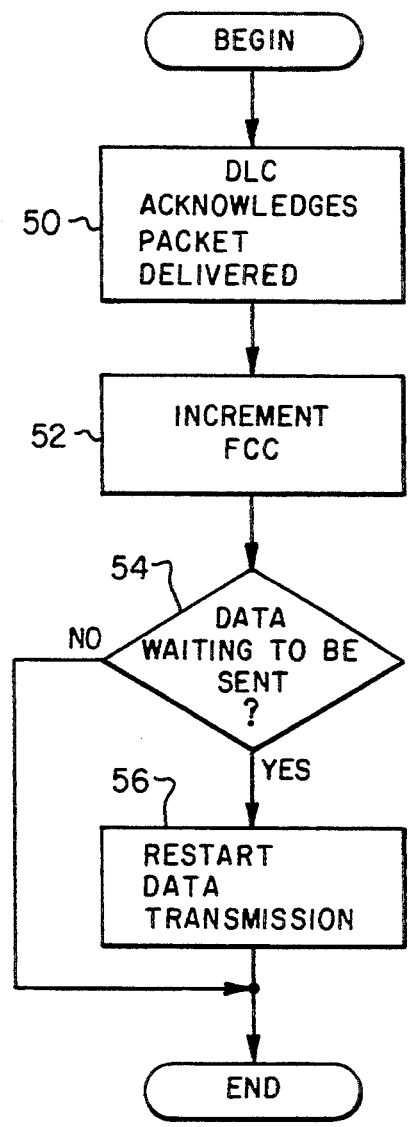

FIG. 3 is a flowchart illustrating how this control mechanism can be implemented. All of the code used to implement the control mechanism shown in FIGS. 3A and 3B is preferably executed as part of the session level 24. Referring to FIG. 3A, at the beginning of a communication session, a variable is initialized 40 to an appropriate value for such session. In FIG. 3, this variable is called the flood control counter (FCC), and is set to the maximum number of packets which may be outstanding, and unacknowledged, for that session. As described above, the FCC is preferably used to count session packets. For jobs such as those characterized as batch sessions in the background, FCC is typically initialized to 1. Interactive sessions, which typically transmit much less data but require a fast response time, may be initialized to higher values such as 5 or 8. If desired, all sessions in a system can be set to some low value, such as 1 or 2, or sessions can be given individual values, based on some priority scheme.

Once FCC has been set to its initial value, the application 22 executes until data is ready to be sent to another system on the network. When a transmission block is ready to send 42, a check is made by the session layer 24 to see whether FCC for that session is equal to 0 44. If so, no data packet may be sent at this time. If FCC is not equal to 0, the transmission block can be sent 46, and the session layer 24 decrements FCC 48. Control then returns to step 42 to await another data packet to be sent.

As is well known in the art, the actual computer code for implementing the flowchart of FIG. 3A will typically not actually provide for a waiting loop such as that shown at block 44. Instead, if the YES branch is taken from step 44, execution will be suspended. An interrupt will be generated when FCC is incremented, as shown in FIG. 3B, and execution of the software will restart with step 46.

Referring to FIG. 3B, an interrupt routine is shown which is also performed by the session layer 24. When the data link controller (DLC) acknowledges that a data packet was successfully delivered to the system at the other end of the physical link 14, FCC is incremented 52. If additional data packets are waiting to be sent 54, data transmission is restarted 56 as just described. If no additional data packets are waiting to be sent, the interrupt routine of FIG. 3B ends.

FIG. 4 is a chart providing an example of the technique described above to illustrate its operation. Column 60 indicates arbitrary times at which events take place, and column 62 describes the various events. At some time periods, two events occur, while only one event occurs at others. When two events are shown, the first listed event occurs, and is completed, before the second begins. Column 64 indicates the contents of the data link controller buffer after each corresponding event.

In this example, three sessions, S1, S2, and S3, are sharing a single physical communications line. The contents of the DLC buffer are shown with the terms P1, P2, and P3. P1 indicates the presence in the DLC buffer of a packet sent by the first session, while P2 and P3 indicate the presence of packets sent by the second and third sessions, respectively. As is known in the art, packet size is a variable which is negotiated when the communication session is set up, so that packets P1 may or may not have the same size as the packets P2 or P3. Depending on system parameters, such as size of the DLC buffer 30, the initial value of FCC can be chosen to accommodate the size of the packets used by the session if desired. In column 64, the packet at the left end of the line is at the front of the FIFO queue, and is the next packet to be transmitted. Packets newly added to the DLC buffer 30 are added on the right. In this example, FCC for each of the sessions is initialized to 2.

At time T1, session S1 begins sending 10 packets to a receiving system. It is assumed that 10 packets is a value which is acceptable to the receiver as indicated by the adaptive pacing technique. Since FCC equals 2 for session S1, only the first 2 packets P1 are placed into the buffer.

At time T2, the DLC indicates that one packet has been successfully delivered, so S1 sends another packet to the DLC buffer. At time T3, S2 sends one packet to the buffer. If session S1 were not limited in the number of packets which could be placed in the buffer at one time, the packet P2 would be the tenth packet in the queue at time T3. At time T4, another packet is delivered, and since it was a P1 packet, session S1 places another packet P1 into the queue.

At time T5, session S3 starts to send three packets. Since FCC equals 2, only the first 2 packets P3 may be placed into the queue. At times T6–T9, each time a packet is delivered, the corresponding session sends another packet to the data link controller. Since session S3 is only sending 3 packets, at times T10 and T13 no new packets are sent to the data link controller when the P3 packet is successfully delivered. At times T11, T12, T14 and T15, session S1 places another packet P1 into the queue whenever a packet is successfully delivered.

If the flood control technique described above were not used in the example of FIG. 4, all of the P1 packets would be transmitted before any of the P2 packets, with the P3 packets coming last. It will be apparent to those skilled in the art that, as illustrated by this example, both of these sessions P2 and P3 obtained shorter delays prior to sending data over the link. This translates directly to improved response time for interactive type sessions. The S1 session, in which response time is not as important, finishes its transmission at a later time, but this delay is acceptable.

The time savings illustrated above can be much greater than the examples shown, which is for purposes of illustration only. It will be appreciated that, without the described flood control technique, long delays can be encountered by some sessions, which may only need to send one or a small number of packets, when other sessions are in the process of sending dozens or hundreds of packets.

As will be appreciated by reading the above description, the functioning of the flood control mechanism is independent of the window size considerations of the adaptive pacing technique. This is true even though the described technique is especially useful in overcoming a shortcoming of the adaptive pacing technique. As will be appreciated by those skilled in the art, the above technique finds applicability in systems which do not use the adaptive pacing approach to session level control. In any system wherein a low level FIFO buffer can be flooded by a process transmitting a large amount of data, the above approach can be adapted to provide fairer access for competing processes.

While the invention has been shown in only one of its forms, it is not thus limited but is susceptible to various changes and modifications without departing from the spirit thereof.

I claim:

1. A system for controlling communications in a computer processing system, comprising:
    a first computer system having at least first and second processes executing thereon, each process having a transfer buffer for holding data packets to be transmitted;
    a second computer system;
    a communications link connecting the first and second computer systems;
    means for establishing communications sessions between the first process and the second computer system, and between the second process and the second computer system, each communication session transmitting data packets to the second computer system, wherein the second computer system transmits a session level acknowledgement to the first computer system for each data packet received from a process executing on the first computer system, the means for establishing communications further indicating, for each session, a maximum number of data packets which can be transferred to the second computer system without transmittal of session level acknowledgement from the second to the first computer system;
    a send buffer in the first computer system for holding data packets to be transmitted over the communications link;
    a first controller in the first computer system for reading data packets from the send buffer and transmitting such data packets over the communications link to the second computer system, wherein data packets so transmitted are removed from the send buffer; and
    a second controller in the first computer system for moving data packets from both transfer buffers to the send buffer, wherein the second controller limits a number of data packets which can be held in the send buffer for each one of the communications sessions to an amount less than the maximum number of data packets for that session.

2. A system as set forth in claim 1, wherein the second controller further includes:
    means for setting a flood control counter for each communications session, wherein the flood control counter is a number set to the maximum number of data packets from a communications session which can be transferred to the second computer system without transmittal of session level acknowledgement from the second to the first computer system;
    means for decrementing the flood control counter for a communications session upon moving of a data packet for that communications session into the send buffer, wherein data packets are moved only if the flood control counter for a session is greater than zero; and
    means for incrementing the flood control counter for a particular communications session upon transmittal of a data packet for that communications session over the communications link by the first controller.

3. A communications controller as set forth in claim 2, wherein each data packet is defined as transmitted after the entire packet has been transmitted over the communications link.

4. The system of claim 1, wherein the processes comprise communications session level processes.

5. The system of claim 4, wherein the first controller is a data link controller.

6. In a computer communications system for transferring packets of data between a first and a second computer system over a single communications link, wherein a plurality of sessions operate concurrently on the first system and generate data packets to be transferred to the second system, wherein data packets transferred to the second computer system are acknowledged by the second computer system, wherein a send buffer is provided in the first computer system at a data link level to buffer data packets to be transmitted over the communications link, wherein means are provided to transfer data packets from the concurrently operating sessions to the send buffer, and wherein each session has a maximum allowable number of unacknowledged data packets transmitted from the first to the second system, the improvement comprising:
    means for setting, for each session operating on the first system a counter indicating a maximum number of packets which are allowed to reside in the send buffer, regardless of the maximum number of unacknowledged data packets allowable for that session;
    means for, when a packet is moved into the send buffer, decrementing the counter for that session;
    means for allowing movement of a packet for a session into the send buffer only if the counter for that session is greater than zero; and
    means for, when a packet is transmitted over the communications link, removing such packet from the send buffer and for incrementing the counter for that session.

7. The system of claim 6, wherein the maximum number of unacknowledged data packets for a session is changeable by a process operating on the second computer system.

8. A method of controlling access to a computer network over a common channel from a computer system, comprising the steps of:
- establishing a plurality of communications sessions from the computer system over the common channel;
- within each communications session, generating data for transmission to the network:
- grouping the data generated by the communications sessions into data packets:
- placing data packets generated by the plurality of communications sessions into the communications buffer; and
- for each data packet placed into the buffer, identifying a transmission window for the data packet, transmitting such data packet over the common channel during the transmission window, receiving acknowledgement of receipt of the data packet by a logical destination, and removing such data packet from the buffer after receipt of the acknowledgement;
- responsive to establishment of each communications session, initializing a counter set at a selected maximum number for such communications session;
- responsive to removal of a data packet from the communication buffer, incrementing the counter for the communications session for which the data packet was placed into the communication buffer;
- responsive to placement of a data packet into the communication buffer, decrementing the counter for the communications session for which the packet was placed into the communication buffer; and
- allowing packets to be placed into the data buffer for a communications session only when the counter for a process is greater than zero.

9. The method of claim 8, further comprising the step of providing a data link controller for controlling transmission of data packets from the data buffer over the common channel.

* * * * *